(12) United States Patent
Sonoda et al.

(10) Patent No.: US 12,077,230 B2
(45) Date of Patent: Sep. 3, 2024

(54) STEERING CONTROL DEVICE, STEERING CONTROL METHOD, AND STEERING CONTROL SYSTEM

(71) Applicant: Hitachi Astemo, Ltd., Hitachinaka (JP)

(72) Inventors: Hiroki Sonoda, Hitachinaka (JP); Tomoaki Fujibayashi, Hitachinaka (JP); Yoshiji Hasegawa, Hitachinaka (JP); Kazuya Takahashi, Hitachinaka (JP); Toshihiko Kaneda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 349 days.

(21) Appl. No.: 17/596,440

(22) PCT Filed: May 20, 2020

(86) PCT No.: PCT/JP2020/019926
§ 371 (c)(1),
(2) Date: Dec. 10, 2021

(87) PCT Pub. No.: WO2020/250634
PCT Pub. Date: Dec. 17, 2020

(65) Prior Publication Data
US 2022/0332366 A1  Oct. 20, 2022

(30) Foreign Application Priority Data
Jun. 13, 2019 (JP) .................. 2019-110444

(51) Int. Cl.
*B62D 6/00* (2006.01)
*B62D 7/15* (2006.01)

(52) U.S. Cl.
CPC ............. *B62D 6/002* (2013.01); *B62D 7/159* (2013.01)

(58) Field of Classification Search
CPC ................. B62D 6/002; B62D 7/159
See application file for complete search history.

(56) References Cited

U.S. PATENT DOCUMENTS

2002/0198644 A1   12/2002   Obata et al.

FOREIGN PATENT DOCUMENTS

DE    10 2014 107 309 A1    11/2015
EP         2 974 942 A1     1/2016
(Continued)

OTHER PUBLICATIONS

International Preliminary Report on Patentability (PCT/IB/338 & PCT/IB/373) issued in PCT Application No. PCT/JP2020/019926 dated Dec. 23, 2021, including English translation of document C2 (Japanese-language Written Opinion (PCT/ISA/237) filed on Dec. 10, 2021) (10 pages).

(Continued)

*Primary Examiner* — Jason Holloway
*Assistant Examiner* — Christopher A Buksa
(74) *Attorney, Agent, or Firm* — Crowell & Moring LLP

(57) ABSTRACT

A steering control device, a steering control method, and a steering control system according to the present invention determines a rear wheel steering angle control command for returning a rear wheel steering angle to a predetermined steering angle earlier than a front wheel steering angle when steering wheel operation (that is, operation of a steering wheel) shifts from a state of additional turning to a state of cutback turning, in steering control that steers a rear wheel steering angle of a vehicle in opposite-phase with respect to a front wheel steering angle, and outputs the determined rear wheel steering angle control command to a rear wheel steering device, so that hysteresis of a yaw rate is reduced or eliminated, reducing or eliminating a sense of discomfort given to a driver.

9 Claims, 11 Drawing Sheets

(56) References Cited

FOREIGN PATENT DOCUMENTS

| | | |
|---|---|---|
| JP | 61-75059 A | 4/1986 |
| JP | 2-256564 A | 10/1990 |
| JP | 3-271073 A | 12/1991 |
| JP | 5-58313 A | 3/1993 |
| JP | 2002-370666 A | 12/2002 |
| JP | 2008-24183 A | 2/2008 |
| JP | 2015-182514 A | 10/2015 |
| WO | WO 2013/033917 A1 | 3/2013 |

OTHER PUBLICATIONS

International Search Report (PCT/ISA/210) issued in PCT Application No. PCT/JP2020/019926 dated Jul. 7, 2020 with English translation (six (6) pages).
Japanese-language Written Opinion (PCT/ISA/237) issued in PCT Application No. PCT/JP2020/019926 dated Jul. 7, 2020 (three (3) pages).

STEERING CONTROL DEVICE, STEERING CONTROL METHOD, AND STEERING CONTROL SYSTEM

TECHNICAL FIELD

The present invention relates to a steering control device, a steering control method, and a steering control system.

BACKGROUND ART

Patent Document 1 discloses a rear wheel steering device of a vehicle including an opposite-phase steering mechanism, in which only front wheels are steered according to the steering of the steering wheel until an operation amount of a steering wheel reaches a predetermined steering angle, and only rear wheels are steered in opposite-phase in response to steering of the steering wheel with the steering angle of the front wheels held constant when the steering wheel is steered beyond the predetermined steering angle.

REFERENCE DOCUMENT LIST

Patent Document

Patent Document 1: JP H02-256564 A

SUMMARY OF THE INVENTION

Problem to be Solved by the Invention

In four-wheel steering, in which the rear wheels are steered in opposite-phase in response to steering wheel operation (that is, operation of the steering wheel), when the steering wheel operation shifts from the state of additional turning to the state of cutback turning and the front and rear wheels return to the steering neutral position (steering angle neutral point), hysteresis in which a yaw rate remains may be generated, giving the driver a sense of discomfort.

The present invention has been made in view of the conventional circumstances, and an object of the present invention is to provide a steering control device, a steering control method, and a steering control system capable of reducing or eliminating hysteresis of a yaw rate to reduce or eliminate a sense of discomfort given to the driver.

Means for Solving the Problem

According to an aspect of the present invention, when a steering wheel operation shifts from a state of additional turning to a state of cutback turning, a steering control device determines a rear wheel steering angle control command for returning a rear wheel steering angle to a predetermined steering angle earlier than a front wheel steering angle, and outputs the rear wheel steering angle control command to the rear wheel steering device.

Effects of the Invention

According to the present invention, it is possible to reduce or eliminate the hysteresis of the yaw rate to reduce or eliminate the sense of discomfort given to the driver.

MODE FOR CARRYING OUT THE INVENTION

Embodiments of a steering control device, a steering control method, and the steering control system according to the present invention will be described below with reference to the drawings.

Figure 1:
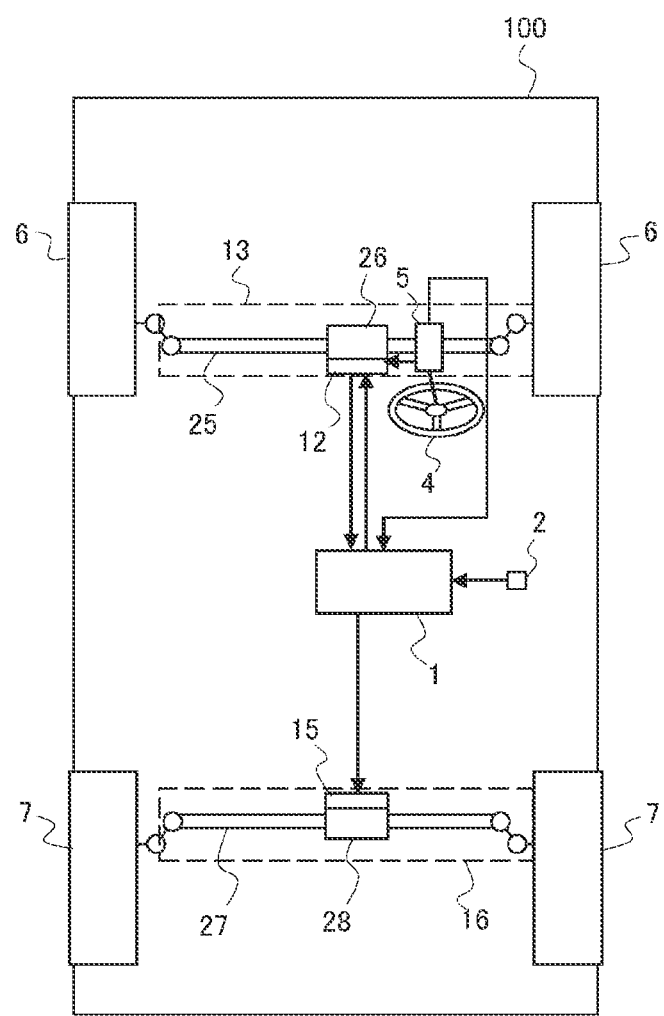
FIG. 1 is a configuration diagram of a vehicle including a steering control device and a steering control system.

FIG. 1 is a configuration diagram of a vehicle 100 including a steering control device and a steering control system according to the present invention.

Vehicle 100 illustrated in FIG. 1 is a four-wheeled vehicle having a pair of front wheels 6,6 and a pair of rear wheels 7,7.

Vehicle 100 includes a front wheel power steering device 13 (front wheel steering device) that controls steering angles of front wheels 6,6 and a rear wheel power steering device 16 (rear wheel steering device) that controls steering angles of rear wheels 7,7, and is a four-wheel steering (4 WS) type vehicle that can steer both front wheels 6,6 and rear wheels 7,7.

Front wheel power steering device 13 includes a steering sensor 5 that detects a steering angle and steering torque of a steering wheel 4, a rack shaft 25 connected to front wheels 6,6 via a link, an actuator 26 that applies thrust to rack shaft 25, and a front wheel steering angle control unit 12 that gives a drive command to actuator 26 based on the detection output of steering sensor 5.

Front wheel power steering device 13 generates thrust by actuator 26 according to the steering angle of steering wheel 4 by a driver detected by steering sensor 5, and assists the driver in steering with the thrust generated by actuator 26, to steer front wheels 6,6.

Front wheel power steering device 13 can be a steer-by-wire type steering device that does not have a mechanical coupling between steering wheel 4 and front wheels 6,6 that are the steered wheels.

Rear wheel power steering device 16 includes a rack shaft 27 connected to rear wheels 7,7 via a link, an actuator 28 that applies thrust to rack shaft 27, and a rear wheel steering angle control unit 15 that gives a drive command to actuator 28 based on a rear wheel steering angle control command from a steering control device 1.

Rear wheel power steering device 16 is an electrically controlled rear wheel steering device that generates thrust with actuator 28 to steer rear wheels 7,7 based on the rear wheel steering angle control command of steering control device 1, independently of steering of steering wheel 4 of the driver.

Based on the vehicle speed VS [km/h] that is the traveling speed of vehicle 100, rear wheel power steering device 16 switches between: an opposite-phase system in which the rear wheel steering angle δr [deg] is steered in opposite-phase to the front wheel steering angle δf, according to the front wheel steering angle δf [deg] based on the driver's steering wheel operation; and an in-phase system in which the rear wheel steering angle δr is steered in the same phase as the front wheel steering angle δf, according to the front wheel steering angle δf based on the driver's steering wheel operation.

For example, when the vehicle speed VS falls below the threshold VSth (for example, VSth=45 km/h), the opposite-phase system controls the rear wheel steering angle or to reduce the turning radius of vehicle 100; and when the vehicle speed VS is equal to or higher than the threshold VSth, the in-phase system controls the rear wheel steering angle δr to reduce or eliminate a yaw generated when vehicle 100 is steered, and to improve the stability of vehicle 100.

Actuator 26 of front wheel power steering device 13 and actuator 28 of rear wheel power steering device 16 are hydraulic or electric actuators.

Front wheel power steering device 13 and rear wheel power steering device 16 are devices that control the steering of the left and right wheels in an integrated manner, but can be devices that can control the steering angles of the left and right wheels independently.

Steering control device 1, front wheel steering angle control unit 12, and rear wheel steering angle control unit 15 are electronic control devices each of which mainly contains a microcomputer including a processor, a memory, I/O, and a bus for connecting them together. The microcomputer functions as a control unit that performs a calculation based on various pieces of input information and outputs the calculation result.

Steering control device 1 inputs signals such as a signal from a vehicle state sensor 2 that acquires motion state information of vehicle 100 and a signal from steering sensor 5, calculates a steering control command based on the input information, and outputs the calculated steering angle control command to front wheel steering angle control unit 12 and rear wheel steering angle control unit 15 via a communication line.

A procedure of rear wheel steering control in the steering control system is described below.

Figure 2:
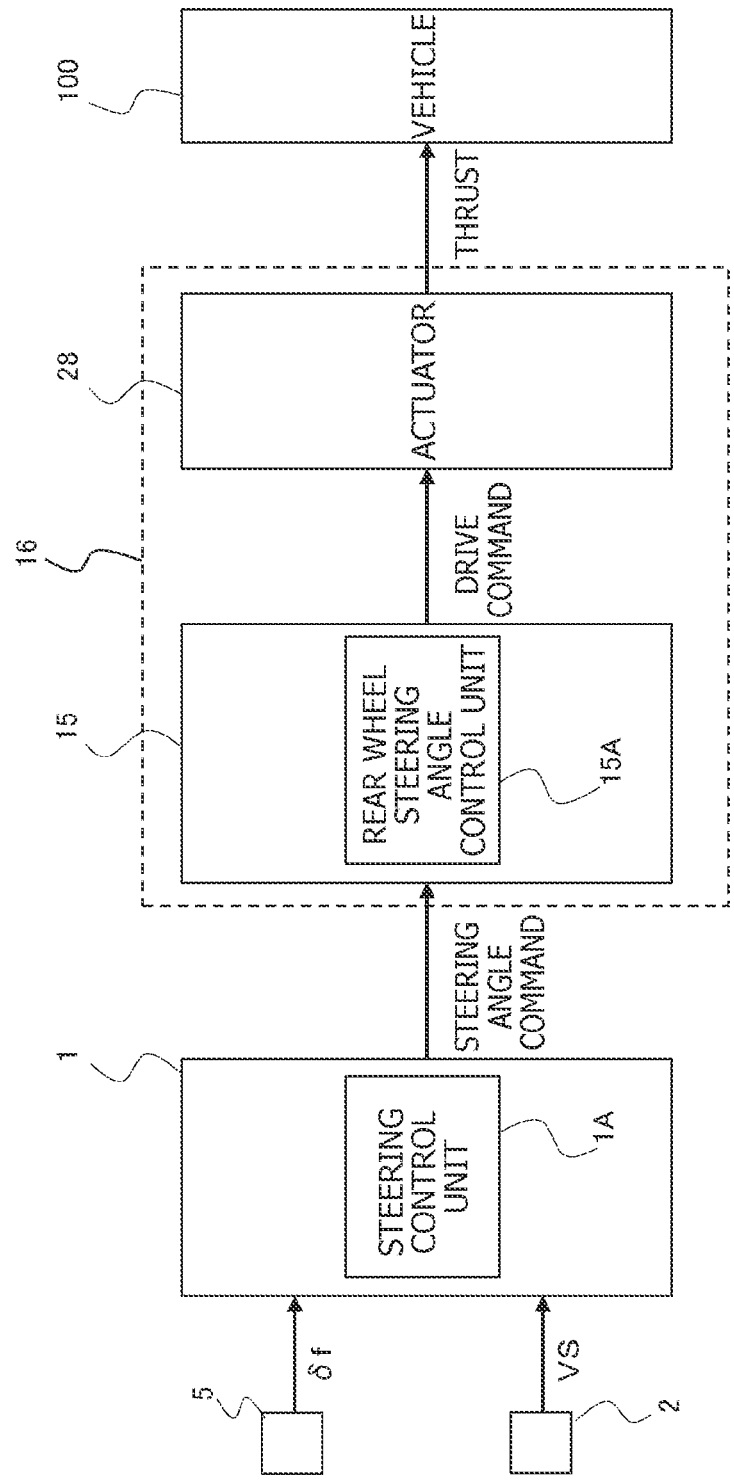
FIG. 2 is an operation explanatory diagram of a steering control system.

FIG. 2 is an operation explanatory diagram of the steering control system.

Steering control device 1, when vehicle 100 is running, acquires information on a front wheel steering angle of detected by the steering sensor 5, and information on the vehicle speed VS included in the motion state information of vehicle 100 detected by vehicle state sensor 2.

Then, a steering control unit 1A of steering control device 1 calculates the rear wheel steering angle control command including information on a target rear wheel steering angle δrt [deg] based on the acquired information on the front wheel steering angle δf and the information on the vehicle speed VS, and outputs the calculated rear wheel steering angle control command to rear wheel steering angle control unit 15.

A rear wheel steering angle control unit 15A of rear wheel steering angle control unit 15 calculates the drive command (operation amount) of actuator 28 for setting the rear wheel steering angle δr to the target rear wheel steering angle δrt based on the rear wheel steering angle control command from the steering control device 1, and gives the calculated drive command to actuator 28.

Actuator 28 generates thrust applied to rack shaft 27 in response to a drive command, the rear wheel steering angle δr changes according to the thrust, and the motion state of vehicle 100 changes.

When the steering wheel operation shifts from a state of additional turning to a state of cutback turning in rear wheel steering control of an opposite-phase system, steering control device 1 determines a rear wheel steering angle control command for returning the rear wheel steering angle δr to a predetermined steering angle earlier than the front wheel steering angle δf, and outputs the rear wheel steering angle control command to rear wheel steering angle control unit 15.

The predetermined steering angle is a steering angle value in a region near a steering neutral position (steering neutral position±α [deg]) including the steering neutral position, and the predetermined steering angle is, for example, the steering neutral position (steering angle=0 deg).

Here, steering control device 1 is set such that the control, in which the ratio of the rear wheel steering angle δr to the front wheel steering angle δf is changed according to the vehicle speed VS to determine the target rear wheel steering angle δrt, causes the rear wheel steering angle δr to return to the predetermined steering angle (steering neutral position) earlier than the front wheel steering angle δf.

Figure 3:
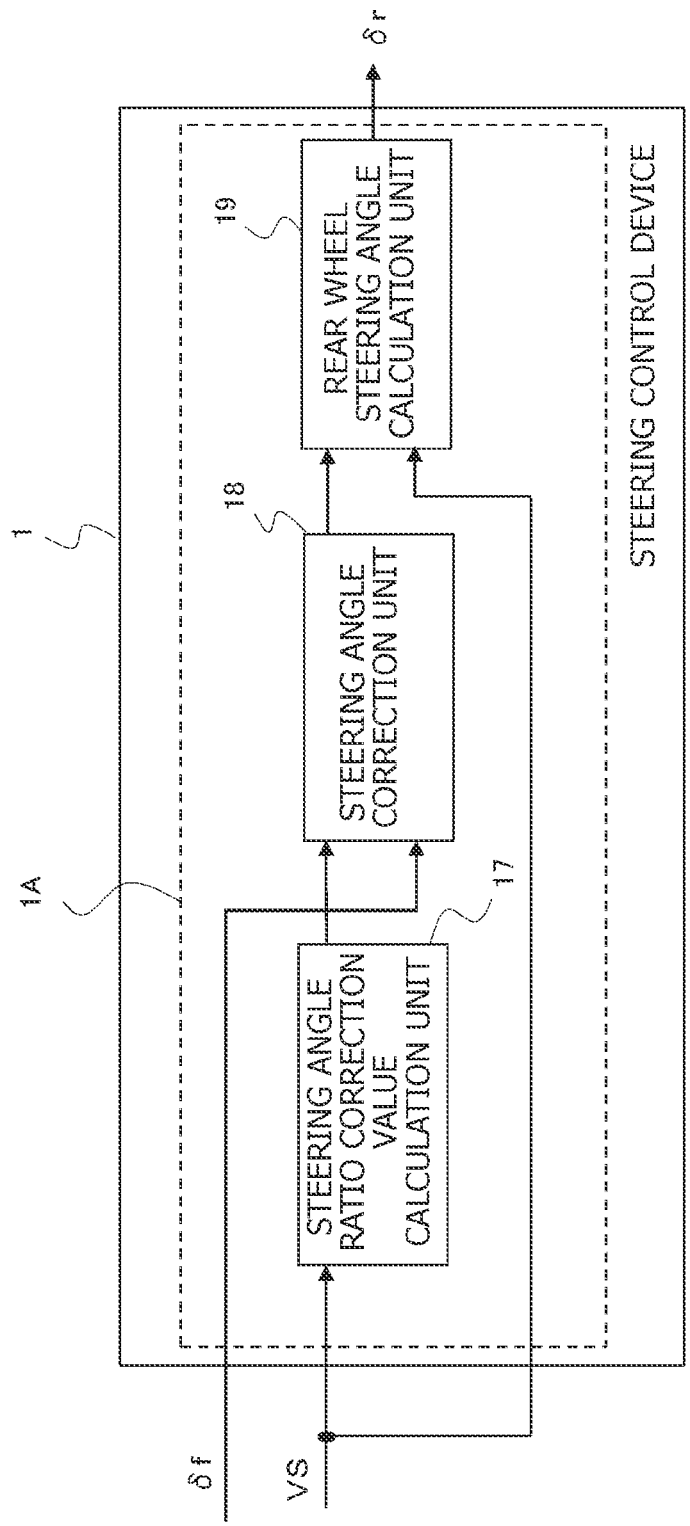
FIG. 3 is a functional block diagram of a steering control device.

FIG. 3 is a functional block diagram of steering control device 1, and illustrates a control function of the rear wheel steering angle δr in an opposite-phase system.

Steering control unit 1A (see FIG. 2) of steering control device 1 includes a steering angle ratio correction value calculation unit 17, a steering angle correction unit 18, and a rear wheel steering angle calculation unit 19.

Steering angle ratio correction value calculation unit 17 receives information on the vehicle speed VS included in the motion state information of vehicle 100 detected by vehicle state sensor 2.

Then, steering angle ratio correction value calculation unit 17 calculates a steering angle ratio correction value SAR [deg] (0≤SAR) based on the acquired information on the vehicle speed VS, and outputs the information on the calculated steering angle ratio correction value SAR to steering angle correction unit 18. The steering angle ratio correction value SAR is information used by steering angle correction unit 18 to change the ratio of the rear wheel steering angle or to the front wheel steering angle δf.

Steering angle correction unit 18 receives information on the front wheel steering angle δf [deg] detected by steering sensor 5, and information on the steering angle ratio correction value SAR calculated by steering angle ratio correction value calculation unit 17.

Then, steering angle correction unit 18 determines the result of subtracting the steering angle ratio correction value SAR from the front wheel steering angle δf so as to be the corrected steering angle δco [deg] (δco=δf−SAR), and outputs the information on the corrected steering angle δco to rear wheel steering angle calculation unit 19.

When the steering direction is expressed by the positive or negative of the steering angle δ [deg], steering angle ratio correction value calculation unit 17 sets the steering angle ratio correction value SAR to a positive value when the steering angles δf of front wheels 6,6 are positive, and sets the steering angle ratio correction value SAR to a negative value when the steering angles δf of front wheels 6,6 are negative.

As a result, regardless of the steering direction of the front wheel steering angle δf being left or right, the greater the absolute value of the steering angle ratio correction value SAR, the smaller the absolute value of the corrected steering angle δco to be calculated.

Furthermore, steering angle correction unit 18 sets the greater one of "δf-SAR" and zero to the corrected steering angle δco when the front wheel steering angle of is positive, sets the smaller one of "δf-SAR" and zero to the corrected steering angle δco when the front wheel steering angle δf is negative.

As a result, when the front wheel steering angle δf is positive and "δf-SAR" becomes negative, the corrected steering angle δco is set to zero, and the corrected steering angle δco is calculated as a value equal to or greater than zero.

Conversely, when the front wheel steering angle δf is negative and "δf-SAR" becomes positive, the corrected steering angle δco is set to zero, and the corrected steering angle δco is calculated as a value equal to or less than zero.

Therefore, in the region near the steering neutral position including the steering neutral position where the absolute value of the front wheel steering angle δf is equal to or less than the absolute value of the steering angle ratio correction value SAR, more particularly, in the steering angle region where the absolute value of the front wheel steering angle δf is equal to or less than the steering angle ratio correction value SAR, the corrected steering angle δco (target rear wheel steering angle δrt) is to be set to zero.

Rear wheel steering angle calculation unit 19 determines the target rear wheel steering angle δrt [deg] based on the information on the corrected steering angle δco acquired from steering angle correction unit 18 and the information on the vehicle speed VS acquired from vehicle state sensor 2, and outputs the information on the determined target rear wheel steering angle δrt to the rear wheel steering angle control unit 15 as a rear wheel steering angle control command.

Rear wheel steering angle calculation unit 19 sets a gain according to the vehicle speed VS, and sets the result of multiplying the set gain by the corrected steering angle δco to the target rear wheel steering angle ort.

Steering control device 1 sets the gain to a negative value in the case of the opposite-phase system to determine the target rear wheel steering angle δrt having a sign different from the front wheel steering angle δf, and sets the gain to a positive value in the case of the in-phase system to determine the target rear wheel steering angle δrt having the same sign as the front wheel steering angle δf.

In the calculation process of the target rear wheel steering angle δrt by rear wheel steering angle calculation unit 19, the target rear wheel steering angle δrt is set to zero when the corrected steering angle δco is zero in the region near the steering neutral position, and the target rear wheel steering angle δrt is set from the corrected steering angle δco with a ratio according to the gain when the corrected steering angle δco is not zero.

This returns the rear wheel steering angle δr to the steering neutral position earlier than the front wheel steering angle δf in the state of cutback turning, and reduces or eliminates the yaw rate remaining in returning to the steering neutral position.

Figure 4:
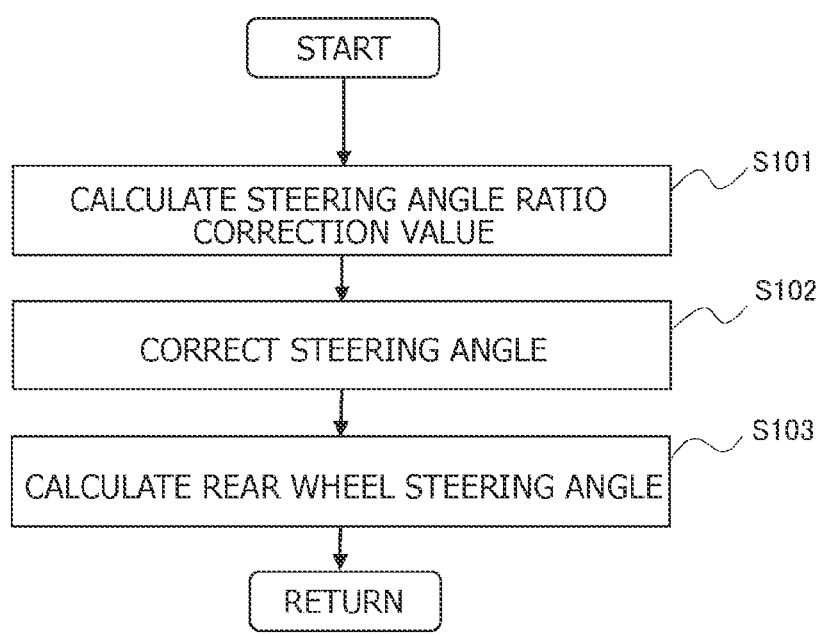
FIG. 4 is a flowchart illustrating a calculation procedure of a rear wheel steering angle control command.

FIG. 4 is a flowchart illustrating the calculation procedure of the rear wheel steering angle control command in the rear wheel steering control of the opposite-phase system.

In step S101 (steering angle ratio correction value calculation unit 17), steering control device 1 calculates the steering angle ratio correction value SAR based on the information on the vehicle speed VS included in the motion state information of vehicle 100 detected by vehicle state sensor 2.

Next, in step S102 (steering angle correction unit 18), steering control device 1 subtracts the steering angle ratio correction value SAR calculated in step S101 from the front wheel steering angle of detected by steering sensor 5 to determine the corrected steering angle δco (δco=δf-SAR).

Furthermore, in step S103 (rear wheel steering angle calculation unit 19), steering control device 1 variably sets the gain according to the information on the vehicle speed VS included in the motion state information of vehicle 100 detected by vehicle state sensor 2, and multiplies the set gain by the corrected steering angle δco determined in step S102 (steering angle correction unit 18) to determine the multiplication result to be the target rear wheel steering angle δrt (δrt=δco×gain).

The processing in the steps S101 to S103 will be described in more detail below.

Figure 5:
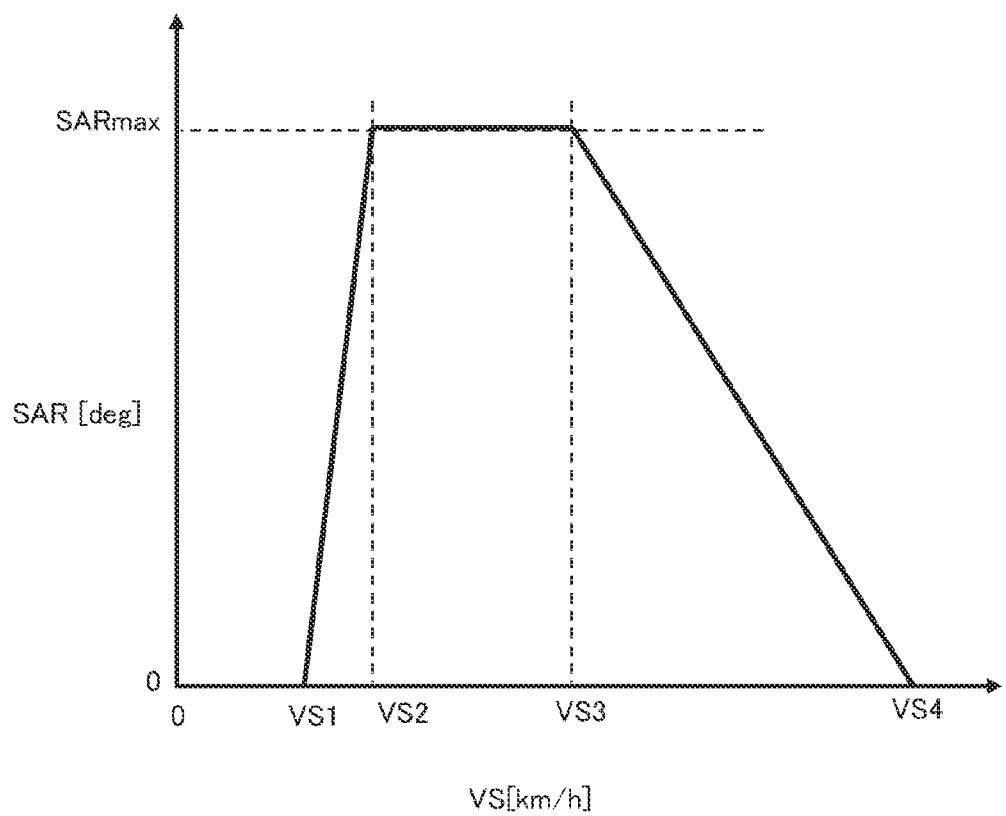
FIG. 5 is a diagram illustrating one aspect of a correlation between a steering angle ratio correction value and a vehicle speed.

FIG. 5 illustrates a diagram that illustrates one aspect of the correlation between the steering angle ratio correction value SAR and the vehicle speed VS to describe the calculation process of the steering angle ratio correction value SAR in step S101 by the steering control device 1 (steering angle ratio correction value calculation unit 17).

In the example of FIG. 5, the region in which the vehicle speed VS is a fourth vehicle speed VS4 (for example, VS4=45 km/h) or higher is the region in which the rear wheel steering control is performed in the in-phase system, and the steering angle ratio correction value SAR used for rear wheel steering angle control is set to zero, which corresponds to the canceled state of correction.

Therefore, in the case of the in-phase system, corrected steering angle δco=front wheel steering angle δf, and multiplying the front wheel steering angle δf by the gain in the in-phase system determines the target rear wheel steering angle δft.

Conversely, the region in which the vehicle speed VS is lower than the fourth vehicle speed VS4 is the region in which the rear wheel steering control is performed in the opposite-phase system.

Here, in the region in which the rear wheel steering control is performed by the opposite-phase system, the extremely low speed region with lower speed than the first vehicle speed VS1 (for example, VS1=8 km/h) is a speed region in which the yaw rate remaining in returning to the steering neutral position by cutback turning of the steering wheel is sufficiently small without correction by steering angle ratio correction value SAR that the driver hardly receives a sense of discomfort.

Therefore, in the extremely low speed region with lower speed than the first vehicle speed VS1, the steering angle ratio correction value SAR is held at zero, which corresponds to the canceled state of the correction.

In other words, in the region in which the vehicle speed VS is lower than the first vehicle speed VS1, the ratio of the rear wheel steering angle δr to the front wheel steering angle δf is not changed by the steering angle ratio correction value SAR, and the ratio is held the same, which cancels the processing to reduce the yaw rate hysteresis.

In the present application, the ratio of the rear wheel steering angle δr to the front wheel steering angle δf is the ratio of the absolute value of the rear wheel steering angle δr to the absolute value of the front wheel steering angle δf.

Therefore, in the region in which the vehicle speed VS is lower than the first vehicle speed VS1, corrected steering angle δco=front wheel steering angle δf, and the target rear wheel steering angle δrt is determined by multiplying the front wheel steering angle δf by the gain in the opposite-phase system.

The steering angle ratio correction value SAR can be set to an initial value greater than zero in the region in which the vehicle speed VS is lower than the first vehicle speed VS1, and the steering angle ratio correction value SAR can be set to a value greater than the initial value in the opposite-phase region of the first vehicle speed VS1 or higher.

Then, when speed region is such that vehicle speed VS is equal to or higher than the first vehicle speed VS1 and is lower than the second vehicle speed VS2 (VS2>VS1) (VS1≤VS<VS2), the steering angle ratio correction value SAR is increased from zero to the maximum value SARmax (for example, SARmax=1 deg) in proportion to the increase in the vehicle speed VS.

In other words, in the speed region of VS1≤VS<VS2, steering control device 1 gradually increases the steering angle ratio correction value SAR as the vehicle speed VS increases, so that the ratio of the rear wheel steering angle δr to the front wheel steering angle δf gradually decreases as the vehicle speed VS increases. In this manner, steering control device 1 gradually changes the state from the state without correction to the state with correction by the steering angle ratio correction value SAR.

Furthermore, in the speed region (VS2≤VS≤VS3) from the second vehicle speed VS2 to the third vehicle speed VS3 (VS1<VS2<VS3<VS4), the steering angle ratio correction value SAR is held at the maximum value SARmax.

In other words, in the speed region of VS2≤VS≤VS3, the ratio of the rear wheel steering angle or to the front wheel steering angle δf is held at the minimum by the steering angle ratio correction value SAR.

Then, in the speed region (VS3<VS≤VS4) from the third vehicle speed VS3 to the fourth vehicle speed VS4, the steering angle ratio correction value SAR is decreased from the maximum value SARmax to zero in proportion to the increase in vehicle speed VS.

In other words, in the region in which the vehicle speed VS is higher than the third vehicle speed VS3, the ratio of the rear wheel steering angle δr to the front wheel steering angle δf gradually increases as the vehicle speed VS increases, and in the speed region equal to or higher than the fourth vehicle speed in which the steering angle ratio correction value SAR decreases to zero, the four-wheel steering is performed in the in-phase system while the steering angle ratio correction value SAR is held at zero. This smoothly switches between the opposite-phase system and the in-phase system accompanied by the correction by the steering angle ratio correction value SAR.

Steering control device 1 can hold a steering angle ratio correction value SAR at a constant value SARpv (SARpv>0) in the entire speed region in which opposite-phase control is performed, or can change a steering angle ratio correction value SAR according to a characteristic represented by an exponential function with respect to the change in the vehicle speed VS. Thus, the correlation between the steering angle ratio correction value SAR and the vehicle speed VS is not limited to the example of FIG. 5.

Steering control device 1 can also switch the characteristics of the steering angle ratio correction value SAR according to the differential value of the front wheel steering angle δf, or can switch the characteristics of the steering angle ratio correction value SAR by detecting steering of additional turning, steering of cutback turning, and steering of switching such as turning from left to right.

Figure 6:
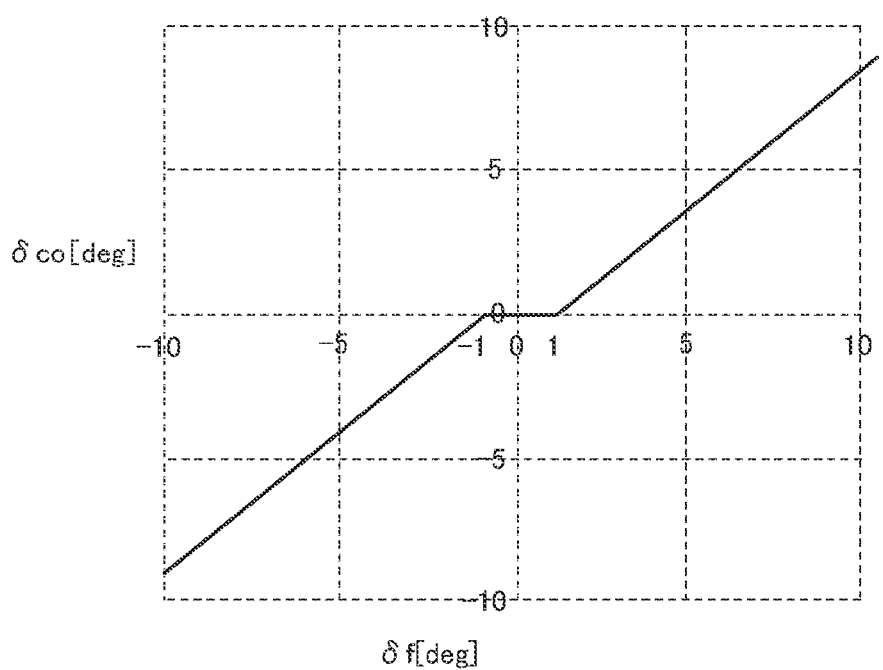
FIG. 6 is a diagram illustrating a corrected steering angle in a speed region in which a steering angle ratio correction value is set to a maximum value.
Figure 7:
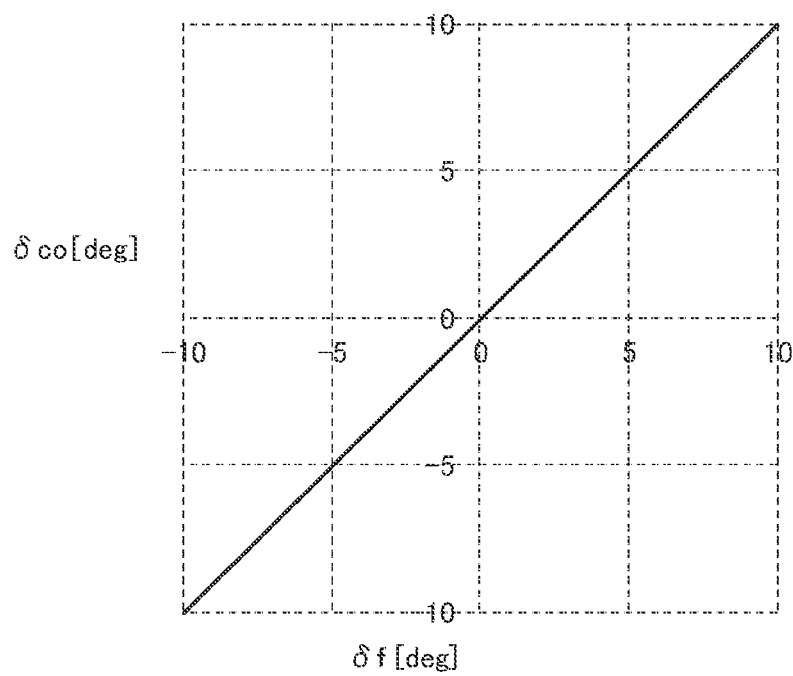
FIG. 7 is a diagram illustrating a corrected steering angle in a speed region in which a steering angle ratio correction value SAR is set to zero.

FIGS. 6 and 7 are diagrams illustrating the corrected steering angle δco that the steering control device 1 determines in step S102, in other words, the result of subtracting the steering angle ratio correction value SAR (see FIG. 5) determined in step S101 from the front wheel steering angle of detected by steering sensor 5.

FIG. 6 illustrates the corrected steering angle δco in the speed region (VS2≤VS≤VS3) in which the steering angle ratio correction value SAR is set to the maximum value SARmax (SARmax=1 deg), and FIG. 7 illustrates the corrected steering angle δco in the speed region (VS1>VS) in which the steering angle ratio correction value SAR is set to zero in the opposite-phase control.

The corrected steering angle δco is calculated in the following expression:

corrected steering angle δco=front wheel steering angle δf−steering angle ratio correction value SAR Thus, when the steering angle ratio correction value SAR is set to zero in opposite-phase control, the front wheel steering angle δf and the corrected steering angle δco are the same as illustrated in FIG. 7.

Then, when steering control device 1 controls the rear wheel steering angle δr according to the target rear wheel steering angle δrt determined by multiplying the corrected steering angle δco (δco=δf) by the gain, and a steering wheel operation shifts from a state of additional turning to a state of cutback turning, the front wheel steering angle δf and the rear wheel steering angle δr return to the steering neutral position where the steering angle δ is 0 deg at substantially the same time.

On the other hand, when the steering angle ratio correction value SAR is set to, for example, the maximum value SARmax (SARmax=1 deg) in the opposite-phase system, the corrected steering angle δco is set to zero while the front wheel steering angle of is from −SARmax to SARmax as illustrated in FIG. 6, and the target rear wheel steering angle δrt, which is determined by multiplying the corrected steering angle δco by the gain, is also set to zero while the front wheel steering angle δf is from −SARmax to SARmax.

Therefore, when the steering wheel operation shifts from a state of additional turning to a state of cutback turning in the speed region in which four-wheel steering is performed by the opposite-phase system, the rear wheel steering angle δr returns to the steering neutral position earlier than the front wheel steering angle δf.

As a result, the yaw rate remaining when the rear wheel steering angle δr returns to the steering neutral position is smaller than the yaw rate that remains when the front and rear wheels return to the steering neutral position at the same time in the state of cutback turning, which can reduce or eliminate the sense of discomfort given to the driver.

The characteristics of the corrected steering angle δco that can reduce the yaw rate remaining when the front wheel steering angle δf returns to the steering neutral position is not limited to the characteristics in which the corrected steering angle δco (rear wheel steering angle δr) is held at zero in the region near the steering neutral position as illustrated in FIG. 6, and any characteristics may be sufficient as long as the rear wheel steering angle δr returns to a predetermined steering angle near the steering neutral position earlier than the front wheel steering angle δf.

Figure 8:
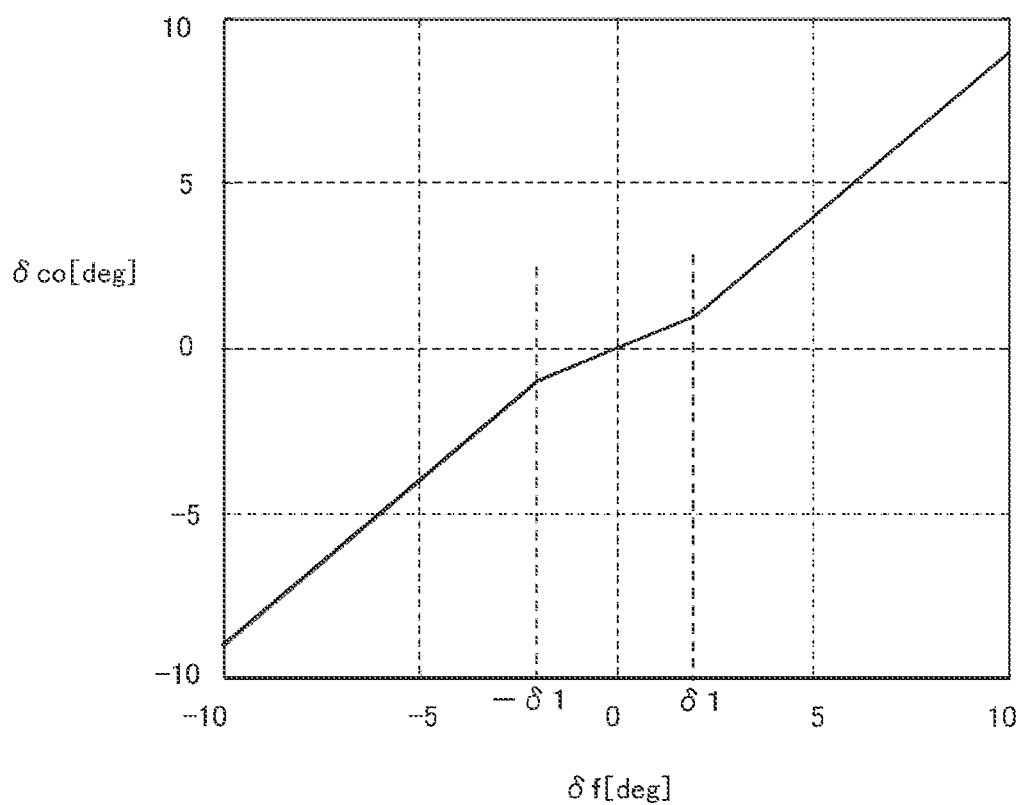
FIG. 8 is a diagram illustrating characteristics of gradually changing a corrected steering angle in a vicinity of a steering neutral position.

FIG. 8 illustrates the characteristics of the corrected steering angle δco when the steering angle ratio correction value SAR is changed based on the differential value of the front wheel steering angle δf and the like.

In the example illustrated in FIG. 8, with reference to the differential value of the steering angle and the like, the steering angle ratio correction value SAR is gradually reduced as the front wheel steering angle δf approaches the operation neutral position in the region near the steering neutral position, and when the front wheel steering angle δf reaches the steering neutral position (δf=0 deg), the corrected steering angle δco (rear wheel steering angle δr) is also set to the steering neutral position (δco=0 deg).

Specifically, the corrected steering angle δco (rear wheel steering angle δr) in FIG. 8 has a smaller inclination when the front wheel steering angle δf is less than the predetermined steering angle θ1 than an inclination when the front wheel steering angle δf is equal to or greater than the predetermined steering angle θ1, so that the corrected steering angle δco (rear wheel steering angle δr) changes more gradually in the vicinity of the steering neutral position.

In other words, there is illustrated characteristics of the rear wheel steering angle control command, which is determined so as to make a second ratio greater than a first ratio. Here, the first ratio is the ratio of the rear wheel steering angle δr to the front wheel steering angle δf when the front wheel steering angle δf is equal to or greater than the predetermined steering angle θ1, and the second ratio is the ratio of the rear wheel steering angle δr to the front wheel steering angle δf when the front wheel steering angle δf is less than the predetermined steering angle θ1.

In the characteristics of the corrected steering angle δco illustrated in FIG. 8, the change in the vehicle turning radius with respect to the steering wheel operation is more linear in the vicinity of the steering neutral position than the change in the case of the characteristics of FIG. 6.

Furthermore, in the characteristics of the corrected steering angle δco illustrated in FIG. 8, when the steering wheel operation shifts from a state of additional turning to a state of cutback turning, the rear wheel steering angle or returns to the predetermined steering angle near the steering neutral position earlier than the front wheel steering angle δf, as compared with the characteristic illustrated in FIG. 7 in which an equation holds: corrected steering angle δco=front wheel steering angle δf. This can reduce or eliminate the yaw rate remaining when the front wheel steering angle δf returns to the steering neutral position.

Figure 9:
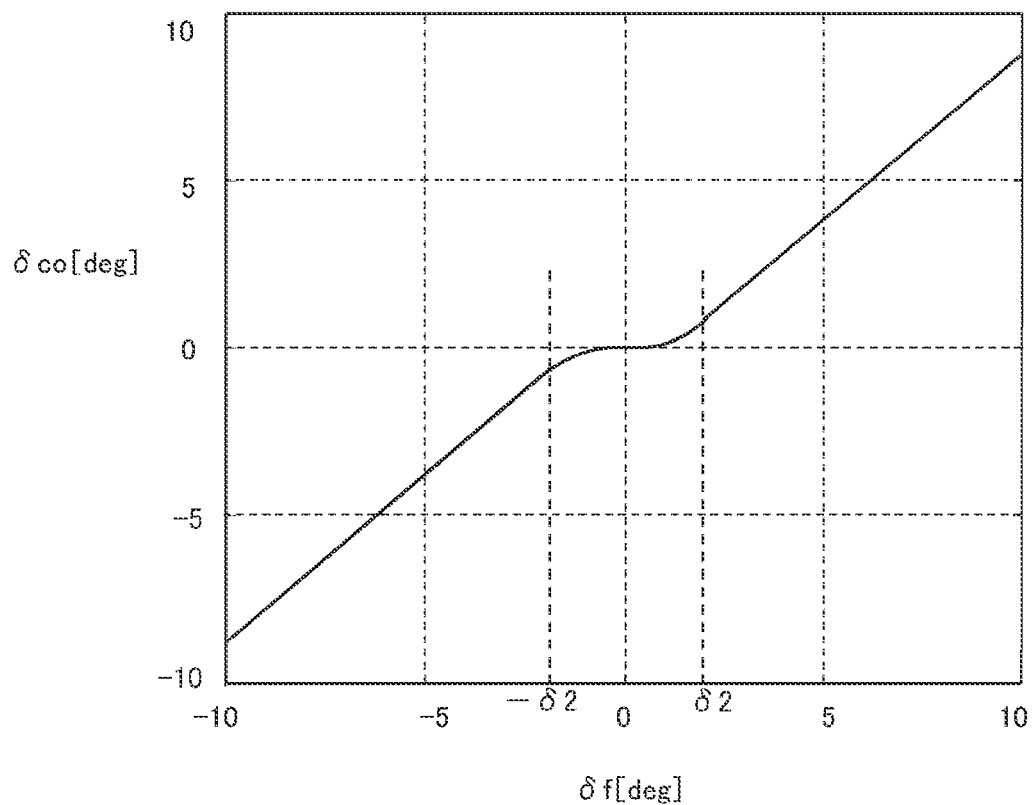
FIG. 9 is a diagram illustrating characteristics of continuously changing an inclination of a corrected steering angle in a vicinity of a steering neutral position.

The characteristics of the corrected steering angle δco illustrated in FIG. 9 are characteristics in which the corrected steering angle δco (rear wheel steering angle δr) is held at zero in the region near the steering neutral position, similarly to the corrected steering angle δco illustrated in FIG. 6, but are such that the inclination of the corrected steering angle δco with respect to the front wheel steering angle δf is continuously reduced toward the steering neutral position when the corrected steering angle δco (rear wheel steering angle δr) becomes zero in approaching the steering neutral position and the change in the vehicle turning radius is more linear in the process of the corrected steering angle δco (rear wheel steering angle δr) reaching zero.

In other words, the corrected steering angle δco in FIG. 9 illustrates characteristics such that the rear wheel steering angle control command is determined so that a second ratio is continuously greater toward the steering neutral position than a first ratio. Here the first ratio is the ratio of the rear wheel steering angle δr to the front wheel steering angle δf when the front wheel steering angle δf is equal to or greater than the predetermined steering angle δ2, and the second ratio is the ratio of the rear wheel steering angle δr to the front wheel steering angle δf when the front steering angle δf is less than the predetermined steering angle δ2.

Figure 10:
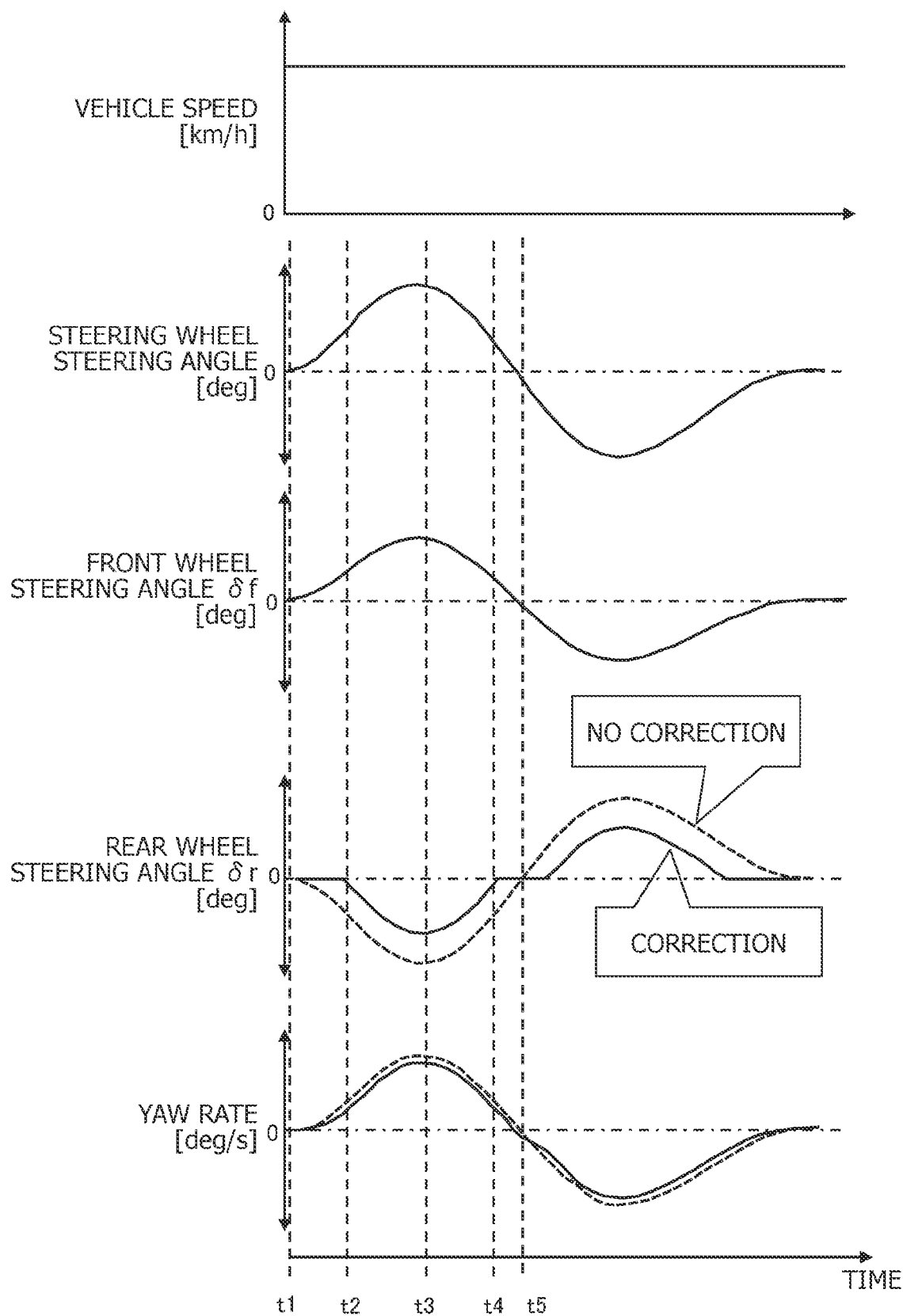
FIG. 10 is a time chart illustrating a correlation between a front wheel steering angle, a rear wheel steering angle, and a yaw rate.

FIG. 10 is a time chart that illustrates a correlation of a front wheel steering angle δf, a rear wheel steering angle δr, and a yaw rate with respect to a steering wheel steering angle (that is, steering angle of steering wheel 4) in the opposite-phase system, in cases in which a correction by the steering angle ratio correction value SAR (see FIG. 5) is performed (when a correction is performed) and a correction is not performed (when a correction is not performed).

At time t1, the steering wheel operation is started, and the front wheel steering angle δf is increased by the operation of additional turning that increases the steering wheel steering angle.

Here, when there is a correction, the front wheel steering angle δf increases at the beginning of the steering wheel operation, but the rear wheel steering angle δr does not increase and is held at the neutral position. On the other hand, when there is no correction, the rear wheel steering angle δr increases as the front wheel steering angle δf increases from the beginning of the steering wheel operation.

Then, at time t2, when the front wheel steering angle δf becomes the steering angle ratio correction value SAR or more, the rear wheel steering angle δr with the correction also increases.

The above operation can prevent a sudden increase in the yaw rate at the initial stage of the steering wheel operation of additional turning.

From time t3, the front wheel steering angle δf decreases and the rear wheel steering angle δr also decreases due to the cutback turning operation in which the steering wheel steering angle decreases.

At time t4, with a correction, when the front wheel steering angle δf becomes equal to or less than the steering angle ratio correction value SAR, the rear wheel steering angle δr becomes zero.

On the other hand, without any correction, when the steering wheel steering angle becomes zero at time t5, the steering angle of the front wheels δf and the steering angle of the rear wheels Or become zero.

In other words, when there is a correction, the rear wheel steering angle δr returns to the steering neutral position (steering angle=zero) earlier than the front wheel steering angle δf in the state of cutback turning in the steering wheel operation.

The above operation with a correction decreases the yaw rate with respect to the steering wheel steering angle earlier than the operation without any correction. This can reduce the yaw rate generated when the driver sets the steering angle to zero and can reduce the sense of discomfort felt by the driver due to the yaw rate generated when the steering wheel steering angle is set to zero.

Figure 11:
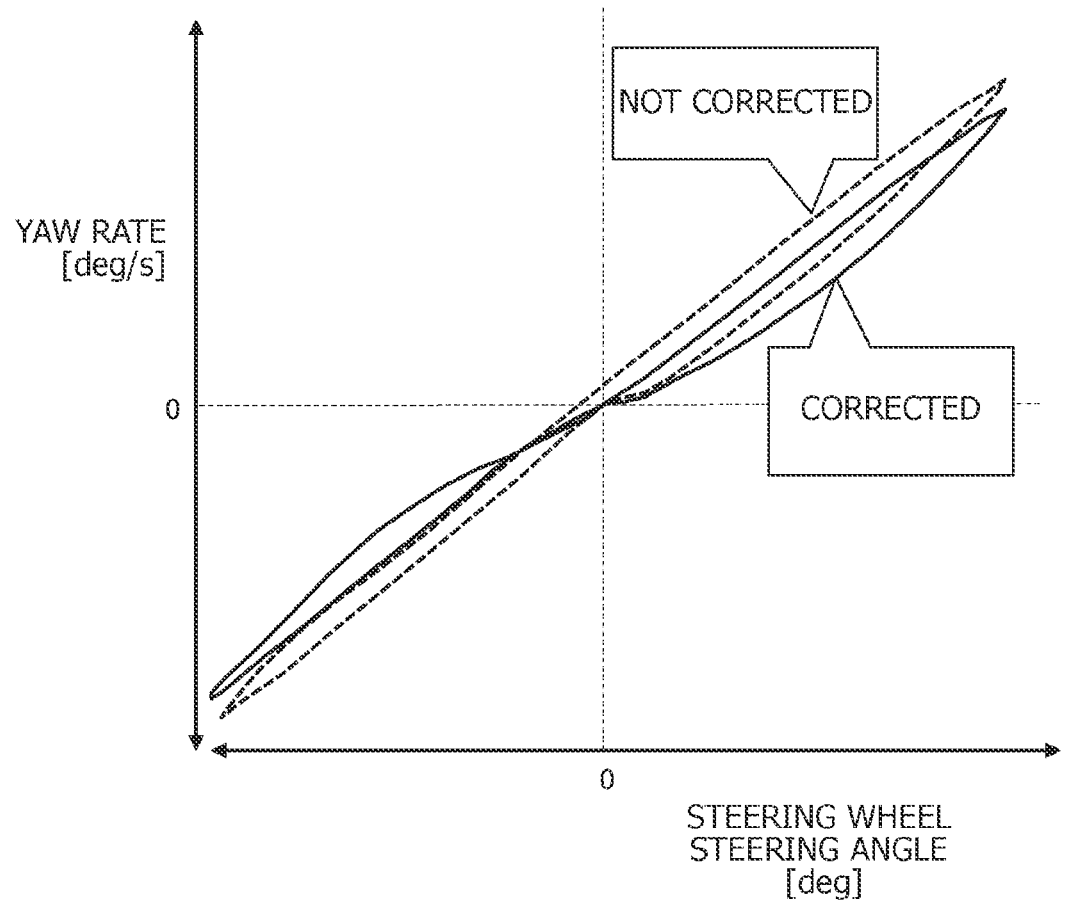
FIG. 11 is a diagram illustrating a relationship between a steering wheel steering angle and a yaw rate.

FIG. 11 illustrates the relationship between the steering wheel steering angle and the yaw rate in the operation of FIG. 10.

As illustrated in FIG. 11, hysteresis of yaw rate with respect to the steering wheel steering angle when there is a correction is smaller than that when there is no correction, so that the yaw rate generated with respect to the steering wheel steering angle can be made more linear.

This makes it possible to provide more linear vehicle movement for the driver's steering wheel operation.

The technical ideas described in the above embodiment can be used in combination as appropriate as long as there is no conflict.

Furthermore, the present invention is specifically described with reference to preferred embodiments, but it is obvious that one skilled in the art can adopt various modifications based on the basic technical idea and teaching of the present invention.

In the above embodiment, steering control device 1 determines the target rear wheel steering angle δrt by multiplying the corrected steering angle δco, determined by subtracting the steering angle ratio correction value SAR from the front wheel steering angle δf, by the gain, but the configuration is not limited to the configuration in which the arithmetic processing is performed, any configuration may be sufficient as long as it can finally determine a rear wheel steering angle control command for returning the rear wheel steering angle δr to a predetermined steering angle earlier than the front wheel steering angle δf in the state of cutback turning.

Alternatively, when vehicle 100 includes a yaw rate sensor that detects the yaw rate, steering control device 1 can learn the steering angle ratio correction value SAR based on the yaw rate when the steering wheel steering angle is zero, and can determine the corrected steering angle δco based on the learned steering angle ratio correction value SAR.

REFERENCE SYMBOL LIST

1 Steering control device (control unit)
2 Vehicle state sensor
4 Steering wheel
6 Front wheel
7 Rear wheel
13 Front wheel power steering device (front wheel steering device)
16 Rear wheel power steering device (rear wheel steering device)
100 Vehicle

The invention claimed is:

1. A steering control device comprising:
a control unit that outputs a calculation result based on input information to a rear wheel steering device that controls a rear wheel steering angle of a vehicle so as to be steered in opposite-phase with respect to a front wheel steering angle according to the front wheel steering angle of the vehicle based on a driver's steering wheel operation,
wherein the control unit determines a rear wheel steering angle control command for returning the rear wheel steering angle to a predetermined steering angle earlier than the front wheel steering angle when the steering wheel operation shifts from a state of additional turning to a state of cutback turning, and outputs the rear wheel steering angle control command to the rear wheel steering device,
wherein the control unit sets the predetermined steering angle to a steering angle value in a vicinity including a steering neutral position, and
wherein the control unit determines the rear wheel steering angle control command so that a second ratio is greater than a first ratio, the first ratio being a ratio of the rear wheel steering angle to the front wheel steering angle when the front wheel steering angle is equal to or greater than the predetermined steering angle, and the second ratio being a ratio of the rear wheel steering angle to the front wheel steering angle when the front wheel steering angle is less than the predetermined steering angle.

2. The steering control device according to claim 1, wherein the control unit determines the rear wheel steering angle control command so that a second ratio is continuously greater than a first ratio, the first ratio being a ratio of the rear wheel steering angle to the front wheel steering angle when the front wheel steering angle is equal to or greater than the predetermined steering angle, and the second ratio being a ratio of the rear wheel steering angle to the front wheel steering angle when the front wheel steering angle is less than the predetermined steering angle.

3. A steering control device comprising:
a control unit that outputs a calculation result based on input information to a rear wheel steering device that controls a rear wheel steering angle of a vehicle so as to be steered in opposite-phase with respect to a front wheel steering angle according to the front wheel steering angle of the vehicle based on a driver's steering wheel operation,
wherein the control unit determines a rear wheel steering angle control command for returning the rear wheel steering angle to a predetermined steering angle earlier than the front wheel steering angle when the steering wheel operation shifts from a state of additional turning to a state of cutback turning, and outputs the rear wheel steering angle control command to the rear wheel steering device,
wherein the control unit changes a ratio of the rear wheel steering angle to the front wheel steering angle according to a speed of the vehicle to determine the rear wheel steering angle control command, and
wherein the control unit, when a speed of the vehicle is lower than a first vehicle speed, determines the rear wheel steering angle control command so that the ratio is the same.

4. The steering control device according to claim 3, wherein when a speed of the vehicle is equal to or higher than the first vehicle speed and lower than a second vehicle speed that is higher than the first vehicle speed, the control unit determines the rear wheel steering angle control command so that the ratio gradually decreases as a speed of the vehicle increases.

5. The steering control device according to claim 4, wherein when a speed of the vehicle is higher than a third vehicle speed that is higher than the second vehicle speed, the control unit determines the rear wheel steering angle control command so that the ratio gradually increases as a speed of the vehicle increases.

6. A steering control method for a vehicle including a rear wheel steering device that controls a rear wheel steering angle of the vehicle so as to be steered in opposite-phase with respect to a front wheel steering angle according to the front wheel steering angle of the vehicle based on a driver's steering wheel operation, the steering control method comprising the steps of:
determining a rear wheel steering angle control command for returning the rear wheel steering angle to a predetermined steering angle earlier than the front wheel steering angle when the steering wheel operation shifts from a state of additional turning to a state of cutback turning; and outputting the rear wheel steering angle control command to the rear wheel steering device, wherein
the control unit sets the predetermined steering angle to a steering angle value in a vicinity including a steering neutral position, and
the control unit determines the rear wheel steering angle control command so that a second ratio is greater than a first ratio, the first ratio being a ratio of the rear wheel steering angle to the front wheel steering angle when the front wheel steering angle is equal to or greater than the predetermined steering angle, and the second ratio being a ratio of the rear wheel steering angle to the front wheel steering angle when the front wheel steering angle is less than the predetermined steering angle.

7. A steering control method for a vehicle including a rear wheel steering device that controls a rear wheel steering angle of the vehicle so as to be steered in opposite-phase with respect to a front wheel steering angle according to the front wheel steering angle of the vehicle based on a driver's steering wheel operation, the steering control method comprising the steps of:
determining a rear wheel steering angle control command for returning the rear wheel steering angle to a predetermined steering angle earlier than the front wheel steering angle when the steering wheel operation shifts from a state of additional turning to a state of cutback turning; and
outputting the rear wheel steering angle control command to the rear wheel steering device,
wherein the control unit changes a ratio of the rear wheel steering angle to the front wheel steering angle according to a speed of the vehicle to determine the rear wheel steering angle control command, and
wherein the control unit, when a speed of the vehicle is lower than a first vehicle speed, determines the rear wheel steering angle control command so that the ratio is the same.

8. A steering control system comprising:
a rear wheel steering device that controls a rear wheel steering angle of a vehicle so as to be steered in opposite-phase with respect to a front wheel steering angle according to the front wheel steering angle of the vehicle based on a driver's steering wheel operation; and
a control unit that determines a rear wheel steering angle control command for returning the rear wheel steering angle to a predetermined steering angle earlier than the front wheel steering angle when the steering wheel operation shifts from a state of additional turning to a state of cutback turning, and that outputs the rear wheel steering angle control command to the rear wheel steering device,
wherein the control unit sets the predetermined steering angle to a steering angle value in a vicinity including a steering neutral position, and
wherein the control unit determines the rear wheel steering angle control command so that a second ratio is greater than a first ratio, the first ratio being a ratio of the rear wheel steering angle to the front wheel steering angle when the front wheel steering angle is equal to or greater than the predetermined steering angle, and the second ratio being a ratio of the rear wheel steering angle to the front wheel steering angle when the front wheel steering angle is less than the predetermined steering angle.

9. A steering control system comprising:
a rear wheel steering device that controls a rear wheel steering angle of a vehicle so as to be steered in opposite-phase with respect to a front wheel steering angle according to the front wheel steering angle of the vehicle based on a driver's steering wheel operation; and
a control unit that determines a rear wheel steering angle control command for returning the rear wheel steering angle to a predetermined steering angle earlier than the front wheel steering angle when the steering wheel operation shifts from a state of additional turning to a state of cutback turning, and that outputs the rear wheel steering angle control command to the rear wheel steering device, wherein
the control unit changes a ratio of the rear wheel steering angle to the front wheel steering angle according to a speed of the vehicle to determine the rear wheel steering angle control command, and
the control unit, when a speed of the vehicle is lower than a first vehicle speed, determines the rear wheel steering angle control command so that the ratio is the same.

* * * * *